United States Patent
Drew et al.

(10) Patent No.: US 11,248,988 B2
(45) Date of Patent: Feb. 15, 2022

(54) LENS EXAMINATION EQUIPMENT AND METHOD

(71) Applicant: EYOTO GROUP LIMITED, Birmingham (GB)

(72) Inventors: Thomas Drew, Birmingham (GB); Michal Krawczynski, Birmingham (GB); Omkar Joshi, Birmingham (GB); Joseph Davies, Birmingham (GB); Suraj Sudera, Birmingham (GB); Jonathan Dean, Birmingham (GB)

(73) Assignee: Eyoto Group Limited, Birmingham (GB)

( * ) Notice: Subject to any disclaimer, the term of this patent is extended or adjusted under 35 U.S.C. 154(b) by 476 days.

(21) Appl. No.: 16/342,715

(22) PCT Filed: Oct. 17, 2017

(86) PCT No.: PCT/GB2017/053136
§ 371 (c)(1),
(2) Date: Apr. 17, 2019

(87) PCT Pub. No.: WO2018/073577
PCT Pub. Date: Apr. 26, 2018

(65) Prior Publication Data
US 2020/0041378 A1    Feb. 6, 2020

(30) Foreign Application Priority Data

Oct. 18, 2016 (GB) ................ 1617652
Nov. 23, 2016 (GB) ................ 1619772

(51) Int. Cl.
*G01M 11/02*    (2006.01)

(52) U.S. Cl.
CPC .... *G01M 11/0264* (2013.01); *G01M 11/0214* (2013.01)

(58) Field of Classification Search
CPC ......... G01M 11/0264; G01M 11/0207; G01M 11/0214; G01M 11/0235
See application file for complete search history.

(56) References Cited

U.S. PATENT DOCUMENTS

| 5,717,781 A | 2/1998 | Ebel et al. |
| 2007/0115353 A1 | 5/2007 | Divo et al. |

(Continued)

FOREIGN PATENT DOCUMENTS

| CN | 1092166 A | 9/1994 |
| CN | 1916696 A | 2/2007 |

(Continued)

*Primary Examiner* — Kara E. Geisel
*Assistant Examiner* — Amanda H Merlino
(74) *Attorney, Agent, or Firm* — Dickinson Wright PLLC

(57) ABSTRACT

A test pattern (170) comprising a set of dots (174) which define a first ellipse (176) of best fit in which the major and minor axes R1, R2 are equal (i.e. a circle) is displayed on a plane surface and a digital image of the (usually distorted) test pattern seen through a lens is captured. A second ellipse of best fit joining the dots in the set is derived from the distorted test pattern in the image. Characteristics of the first and second ellipses are compared to determine the degree and nature of distortion to the test pattern, from which the power of the lens is calculated. The major and minor axes of the first and second ellipses may be compared. The test pattern can include a number of said sets of dots distributed over an area of the surface with each set being analysed to determine the optical parameters of the lens at multiple locations.

13 Claims, 10 Drawing Sheets

(56) References Cited

U.S. PATENT DOCUMENTS

2013/0293726 A1    11/2013   Armstrong-Muntner et al.
2015/0300912 A1    10/2015   Allione

FOREIGN PATENT DOCUMENTS

| CN | 201173856 Y | 12/2008 |
|---|---|---|
| EP | 1061329 A2 | 12/2000 |
| EP | 1679499 A2 | 7/2006 |
| WO | 2016/141333 A1 | 9/2016 |

Stage 1

Stage 2

Stage 3 - repeat Stages 1 and 2 for other lens of pair

LENS EXAMINATION EQUIPMENT AND METHOD

CROSS-REFERENCE TO RELATED APPLICATIONS

This application claim priority from PCT/GB2017/053136 filed on Oct. 17, 2017, which claims priority from GB 1617652.1, filed Oct. 18, 2016 and GB 1619772.5, filed Nov. 23, 2016, the contents of which (including all attachments filed therewith) are hereby incorporated by reference in their entirety.

TECHNICAL FIELD OF THE INVENTION

The invention relates to methods and equipment for examining lenses and especially, but not exclusively, ophthalmic lenses in glasses.

BACKGROUND TO THE INVENTION

It is often necessary to be able to determine the optical parameters of a lens such as those used in glasses. This may be required as part of the manufacturing process to ensure a lens conforms to the prescription and may be carried out either before the lens has been assembled into a glasses frame or after. It is also sometimes necessary to determine the optical parameters of a lens in a pair of glasses which have been used, say as part of an ophthalmic examination where the person does not have their prescription to hand or to check that the lens is in conformity with their prescription. The present invention in its various aspects provides several new approaches to these operations, reducing substantially the reliance upon skilled personnel to carry out the tasks. This is particularly important in areas where there is a shortage of such skills.

There is a need for a system for examining lenses which is easy to use and/or which provides more comprehensive data regarding the optical parameters of a lens. There is a need in particular for a portable system for examining lenses in glasses. There is also a need for a system for examining lenses which is substantially fully automated.

In addition, there is need for an alternative method of examining a lens which overcomes, or at least mitigates, some or all of the drawbacks of the known methods.

Further, there is a need for an alternative method of examining a lens which reduces processing time whilst providing data regarding the optical parameters of a lens which is sufficiently accurate.

There is a need in particular for an alternative method of examining a lens which can be used to determine an optical parameter of a lens at multiple locations simultaneously.

SUMMARY OF THE INVENTION

According to a first aspect of the invention, there is provided a method of examining a lens, the method comprising;

a. displaying on a plane surface a test pattern comprising at least one set of dots arranged so that the dots in the set can be joined by a first ellipse of best fit, in which the major and minor axes of the first ellipse are equal;

b. positioning a lens to be examined between the displayed test pattern and a camera and using the camera to capture an image of the (usually distorted) test pattern as seen through the lens ("the lens image");

c. deriving a second ellipse which is an ellipse of best fit joining the dots in said at least one set of dots in the distorted test pattern from the lens image data captured in step b;

d. comparing characteristics of the second ellipse with corresponding characteristics of the first ellipse to determine the degree and nature of distortion to the test pattern produced by the lens and from this determining at least one parameter of the lens, including the power of the lens.

The number of dots in said at least one set may be no more than twenty, or no more than fifteen, or no more than twelve, or no more than ten, or no more than eight, or no more than six.

In an embodiment, said at least one set of dots comprises six dots arranged at the apexes of a notional regular hexagon.

The method may comprise determining the major axis and the minor axis of the second ellipse and comparing these with the major axis and the minor axis respectively of the first ellipse to determine the degree and nature of distortion to the test pattern caused by the lens. When the major and minor axes of the second ellipse are not equal, the method may comprise determining a degree of astigmatic correction (cylindrical power) of the lens and the axis angle of the astigmatic correction.

In one embodiment, the method is used to determine the at least one optical parameter at a single point in the lens, the method comprising aligning the optical centre of the lens with the axis of the camera and with the centre of one of said at least one sets of dots before capturing the lens image and then performing the analysis in steps c and d above in respect of said one of said at least one set of dots from the image data. In this embodiment, the test pattern may consist of a single set of dots only.

In an alternative embodiment, the method is used to determine said at least one optical parameter of the lens at multiple locations within an area of interest of the lens, the method comprising:

e. in step a above, displaying a test pattern comprising a plurality of said sets of dots distributed over an area of the surface;

f. in step b above, positioning the lens so that at least the area of interest of the lens is positioned between the displayed test pattern and the camera before capturing the lens image; and g. performing the analysis in steps c and d above in respect of each of said sets of dots in the test pattern recorded in the lens image within the area of interest to determine said at least one optical parameter at various locations with the area of interest of the lens.

Step g above may comprise deriving a respective second ellipse for each of said sets of dots in the test pattern within the area of interest from the lens image data, determining a major radius and a minor radius for each respective second ellipse and comparing these with the major and minor axes respectively of a first ellipse derivable from the corresponding set of dots in the original test pattern.

The area of interest may comprise substantially the whole of the lens.

The test pattern may comprise a plurality of dots arranged in an array of rows and columns, wherein the dots in each row are equally spaced apart by a distance which is equal to the spacing between adjacent rows, and wherein alternate rows are off-set so that the dots in any given row lie midway between the dots in an adjacent row or rows, such that each dot (other than those at the edges of the array) is surround by six other dots located at the apexes of a notional regular hexagon, wherein each set of six other dots comprises one of said sets of dots. In which case, the analysis in steps c and d above is carried in respect of each set of six surrounding other dots within the area of interest.

The method may comprise displaying the results of the examination graphically in the form of a map of the lens in which the at least one optical parameter is represented as a colour or contour.

The method may include calibration of the system used to carry out the method by:

h. using the camera to capture an of the test pattern displayed on the surface without a lens between the camera and the surface ("the system image");

i. comparing the test pattern in the system image with the original test pattern to determine the degree of distortion to the original test pattern produced by the system;

j. deriving a transform algorithm which applied to the test pattern in the system image will substantially restore it back to the original test pattern and saving the transform algorithm;

k. subsequently when examining a lens, applying the transform algorithm to the test pattern in the captured lens image to remove system distortion before carrying out the analysis in steps c and d above.

The method may comprise using an electronic display screen to display the test pattern. The electronic display screen may be the screen of a tablet style computer, the camera being operatively connected to the computer and the method comprising using the computer to generate the test pattern and to carry out the required image processing and analysis. In this case, the method may comprise displaying the test pattern on one section of the screen and displaying results of the examination on another section of the screen.

Where the above method is carried out on a lens in a pair of glasses, once one or more of the steps set out in the previous paragraphs have been completed, the same steps would normally be carried out for the other lens of the pair of glasses.

In accordance with a second aspect of the invention, there is provided a method for examining lenses in a pair of glasses comprises the steps of:

Displaying on a plane surface a first pattern of regular lines, squares or sine waves in front of a camera, whose axis is perpendicular to the plane of the surface of the display.

Storing a digital representation of the first pattern;

Placing a lens of a pair of glasses such that the top and bottom of the lens are in a plane perpendicular to the camera axis between the camera and the display of the regular pattern and such that the top and bottom of the lens are in a plane perpendicular to the camera axis;

Aligning the optical centre of the lens to the axis of the camera; and

Comparing the distortions of the first pattern as seen through the lens with the stored digital image of the first pattern to identify the magnification of the lens and from this determining the power of the lens across its surface.

A development of the second aspect of the invention comprises:

Replacing the first pattern on the display with a second pattern comprising concentric circles.

Aligning the centre of the circles with the optical centre of the lens and the axis of the camera;

Measuring the distortions of the circles at various points;

Using the measurements to identify the characteristic of the lens in terms of degree of astigmatism, whether it is a plain lens or progressive bifocal and/or prismatic.

Once one or more of the steps set out in the previous paragraphs have been completed, the same steps would normally be carried out for the other lens of a pair of glasses.

In accordance with a third aspect of the invention, there is provided a system for carrying out the method according to either of the first and second aspects of the invention, the system comprising a computing device having a planar display screen, a camera mounted above the screen with the axis of the camera perpendicular to the plane of the screen, the camera being operatively connected to the computing device for storing and processing image data captured by the camera; and a glasses mount for holding a pair of glasses with a lens located between the camera and the test pattern on the display screen in use.

The computing device may be a portable computing device such as a tablet computer.

The camera axis may be offset to one side of the display screen.

The system may comprise a frame mounted to the computing device, the camera being mounted to the frame. The frame may comprise a casing partially enclosing the computing device. The casing may be attached to a base to which the camera is mounted.

The system may comprise a casing partially enclosing the computing device, the casing being attached to a base, the camera being mounted to the base.

The computing device may be configured in use to display the test pattern in a first section of the display screen below the camera and to display the results of the examination in another section of the display screen. The computing device may be configured to process image data capture by the camera as part of the lens examination.

The glasses mount may comprise a plinth slidably mountable on the display screen. The computing device may be arranged in use to display graphic symbols on the display screen to guide a user in correctly positioning the plinth. The means for securing a pair of glasses to the plinth may be a glasses clamp mounted to the plinth. The plinth may define an aperture through which the display screen/display is visible from above when the plinth is positioned on the display screen/display in use and the glasses clamp may be mounted to the plinth such that it can be moved to selectively to position either one of the lenses in a pair of glasses mounted in the clamp above the aperture in use. The glasses clamp may be pivotally mounted to the plinth. The plinth may hold the lenses in a pair of glasses mounted to it at a distance from the display screen/display. The distance may be fixed or the plinth may have at least one separable spacer section which can be selectively removed to vary the distance. The distance may be set substantially at the focal length of a +20 D lens.

The computing device may be programmed to carry out the image data processing and analysis steps of the method in accordance with either of the first and second aspects of the invention.

In accordance with a fourth aspect of the invention, the system according to the third aspect of the invention is used to carry out the method according to either of the first and second aspects of the invention.

According to a fifth aspect of the invention, there is provided, a method of examining lenses comprises aligning a camera perpendicularly to a display, with a lens mounting between the camera and display in which the display comprises multiple rows of spots the dots in each row being equally spaced, the rows being spaced apart by the same distance as the separation between the dots in a row and the spots of one row being midway between the spots in the adjacent row, and taking an image of the dots in the camera and from the camera image driving a first set of circles which represent the circles of best fit for each spot (except the spots on the edges of the display) joining the six spots around each individual spot; placing a lens to be evaluated in the lens mounting and from the new image in the camera deriving a new set of circles or ellipses joining the six spots around each spot in the display, comparing the second set of circles and ellipses with the first set of circles, calculating the degree of distortion at each point in the display caused by the lens to identify the power of the lens at points across its surface and the type of lens concerned.

By use of a computer, it is possible for the characteristics identifying the lens to be displayed on a visual display unit. Ideally the visual display unit has a split screen, in which on in one half the patterns are displayed and on the other half the characteristics of the lens displayed.

Using a tablet style computer, it is possible for the visual display and the computing facility to be combined in one unit.

By using the system and/or methods set out in this invention, it is possible readily and easily to identify the characteristics of glasses being used by a person and whether these are in conformity with what would be prescribed, or whether replacement is necessary. It is also possible to use the system and methods as quality control in a manufacturing facility for glasses and ophthalmic lenses. In both cases the system and methods greatly reduce the need to use skilled optometrists in what is a routine task, allowing the specialist's skills to be employed in identifying persons' needs.

DETAILED DESCRIPTION OF THE INVENTION

In order that the invention in its various aspects may be more clearly understood one or more embodiments thereof will now be described, by way of example only, with reference to the accompanying drawings, of which:

Figure 1:
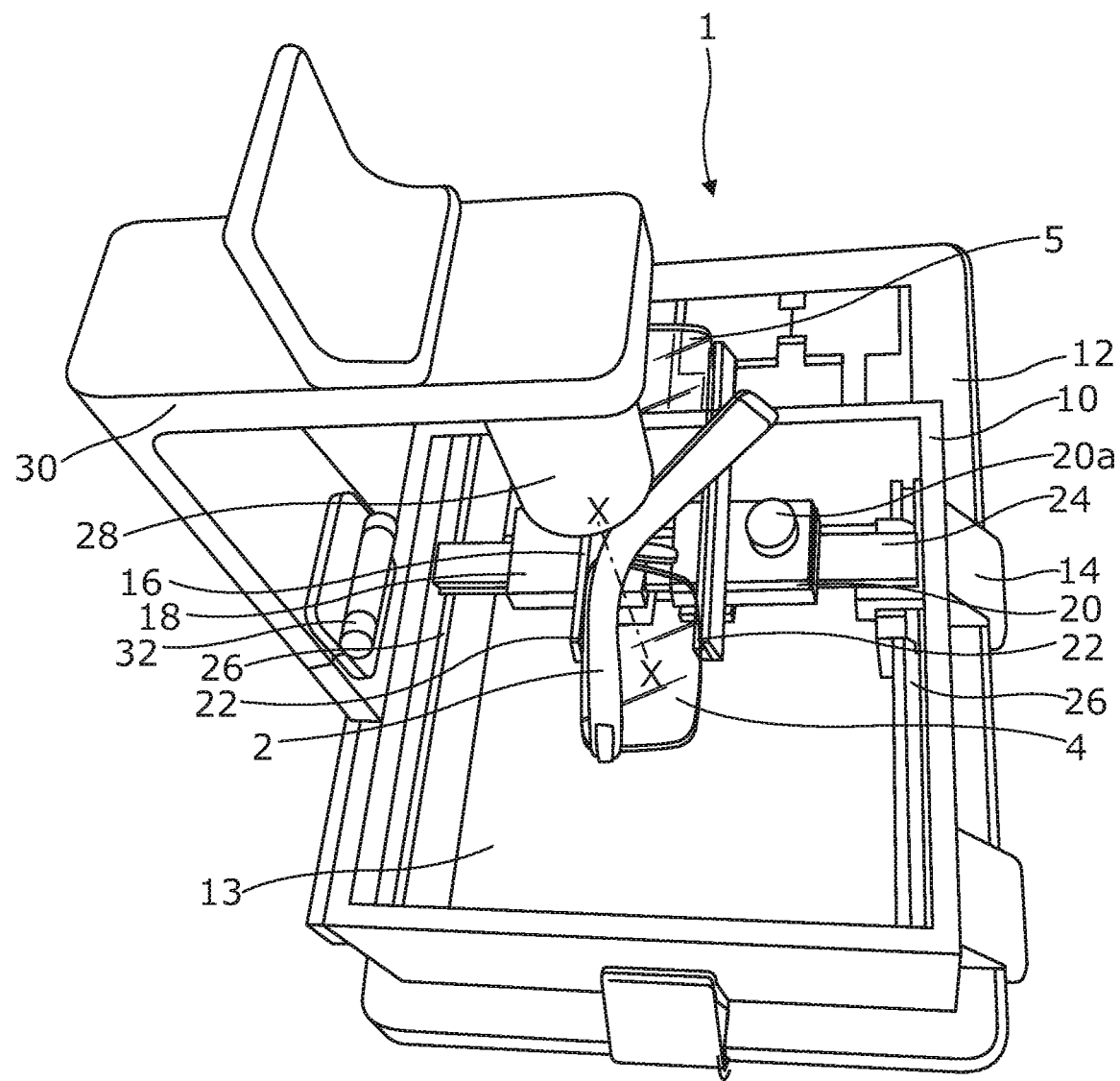
FIG. 1 is a perspective view of a first embodiment of a system for examining lenses in a pair of glasses in accordance with an aspect of the invention, showing the system in an open deployed position.

FIGS. 1 to 4 illustrate a first embodiment of a system 1 for examining a lens in a pair of glasses 2 having a pair of lenses 4 and 5. The system comprises a square frame 10 mounted to a tablet style computer 12 having a built-in visual display unit with a display screen 13. The tablet style computer 12 can be any computing device having a planar digital display screen 13 of a suitable size, such as an i-Pad®. The frame is attached to the computer 12 by a number of mounts 14 extending rearwards from the frame 10 to engage with a rear surface of the computer and which clamp the frame to the computer. A glasses clamp 16 is mounted within the interior of the frame above the display screen 13.

The glasses clamp 16 has a pair of jaws 18, 20, the jaws having grooves 22 in opposing surfaces into which the top and bottom of the pair of glasses 2 are located and held in use. The jaws are mounted on a runner 24 which extends over the display screen from front to rear (as considered with the screen in landscape mode, the longer edges at the front and rear). The jaws 18, 20 are slidably mounted for movement along the runner 24. A spring 25 (seen in FIG. 2) urges jaw 20 towards jaw 18 to grip the top and bottom of the pair of glasses. The jaws can be separated using a knob 20a on the movable jaw 20, which can be gripped by hand to pull jaws 18 and 20 apart. Runner 24 is slidably mounted on a pair of rails 26 which are attached on the inside of opposite sides of the frame 10 at the front and rear of the display screen. It can be seen that the clamp 16 is movable in a plane parallel to the surface of the visual display unit 13 by movement of the jaws along the runner 24 and movement of the runner along the rails 26.

A camera 28 is mounted on a camera mount 30 which locates the camera above part of the display screen with the axis X of the camera perpendicular to the display screen 13. The camera 28 may be a digital camera and is operatively connected to the computer 12 by a suitable cable or other means so that image data captured by the camera can be saved in the computer for processing and analysis and to allow control of the camera by the computer. The camera mount has a hinge 32 enabling the camera to be folded inside the frame 10 when the system is not in use (see FIG. 4).

In the first embodiment as shown in FIGS. 1 to 4, the frame 10 surrounds the left hand half 34 (FIG. 2) of the display screen 13, when considered in landscape mode. In this particular example, the computer 12 is 28 cm wide across, thus the inside dimensions of the frame 10 are 14×14 cm. The right hand half 36 of the display screen 13 (see FIG. 2) is clear for direct viewing.

Figure 2:
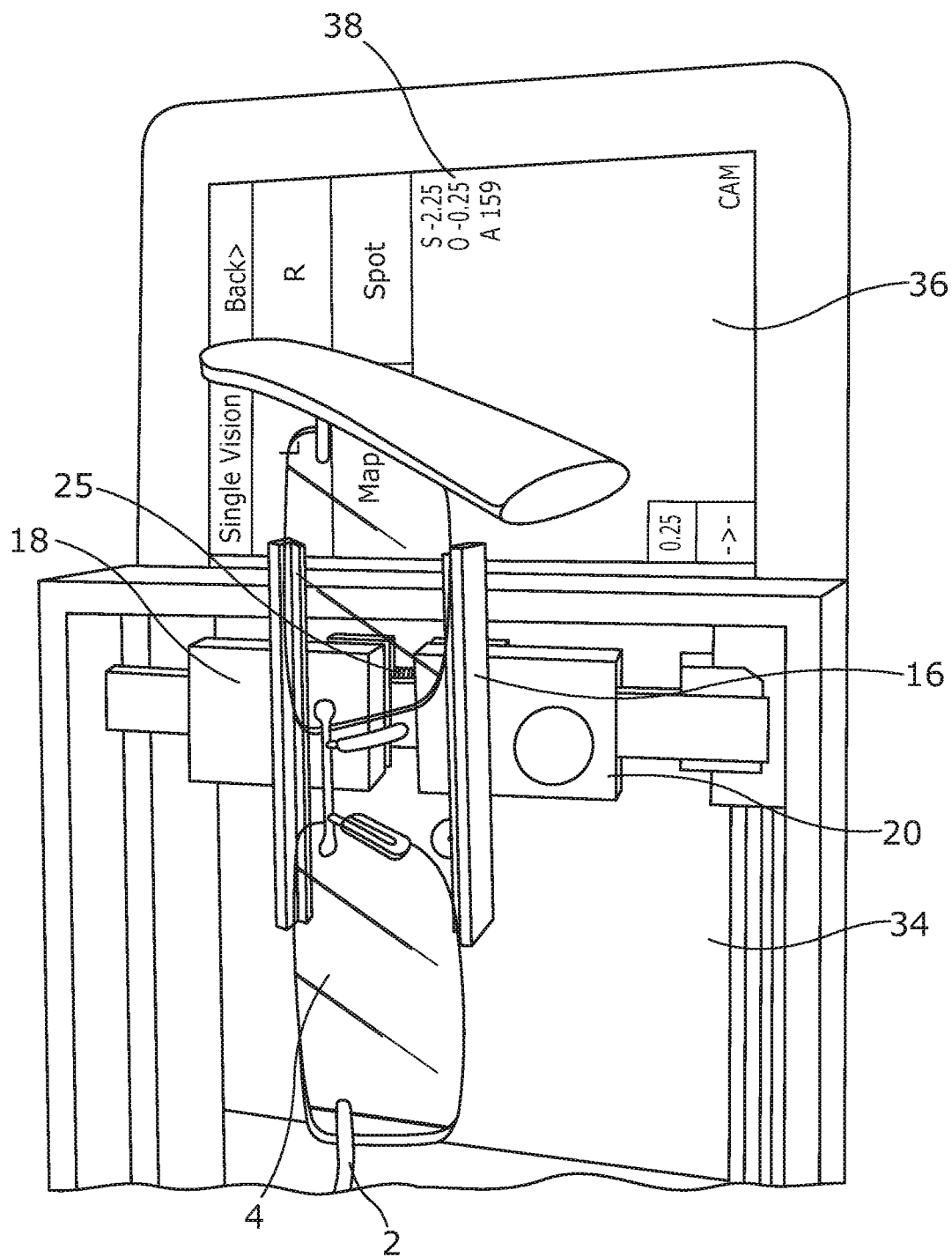
FIG. 2 shows a part of the system of FIG. 1 from above, with parameters calculated for the lens concerned displayed on a display screen of the system.
Figure 3:
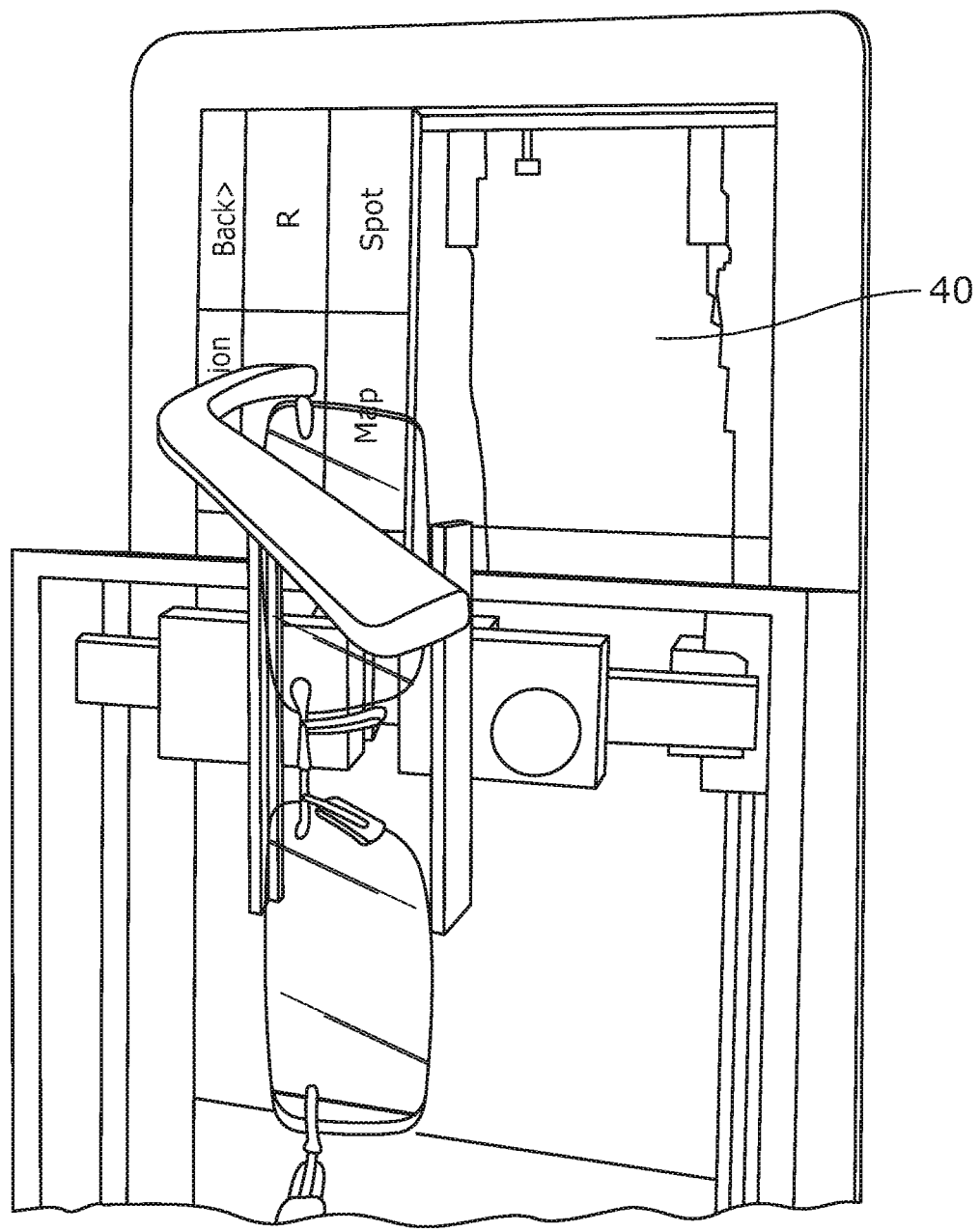
FIG. 3 is a view similar to that of FIG. 2 but illustrating how data relating to the type of lens under examination can be displayed in the form of a map of the lens.
Figure 4:
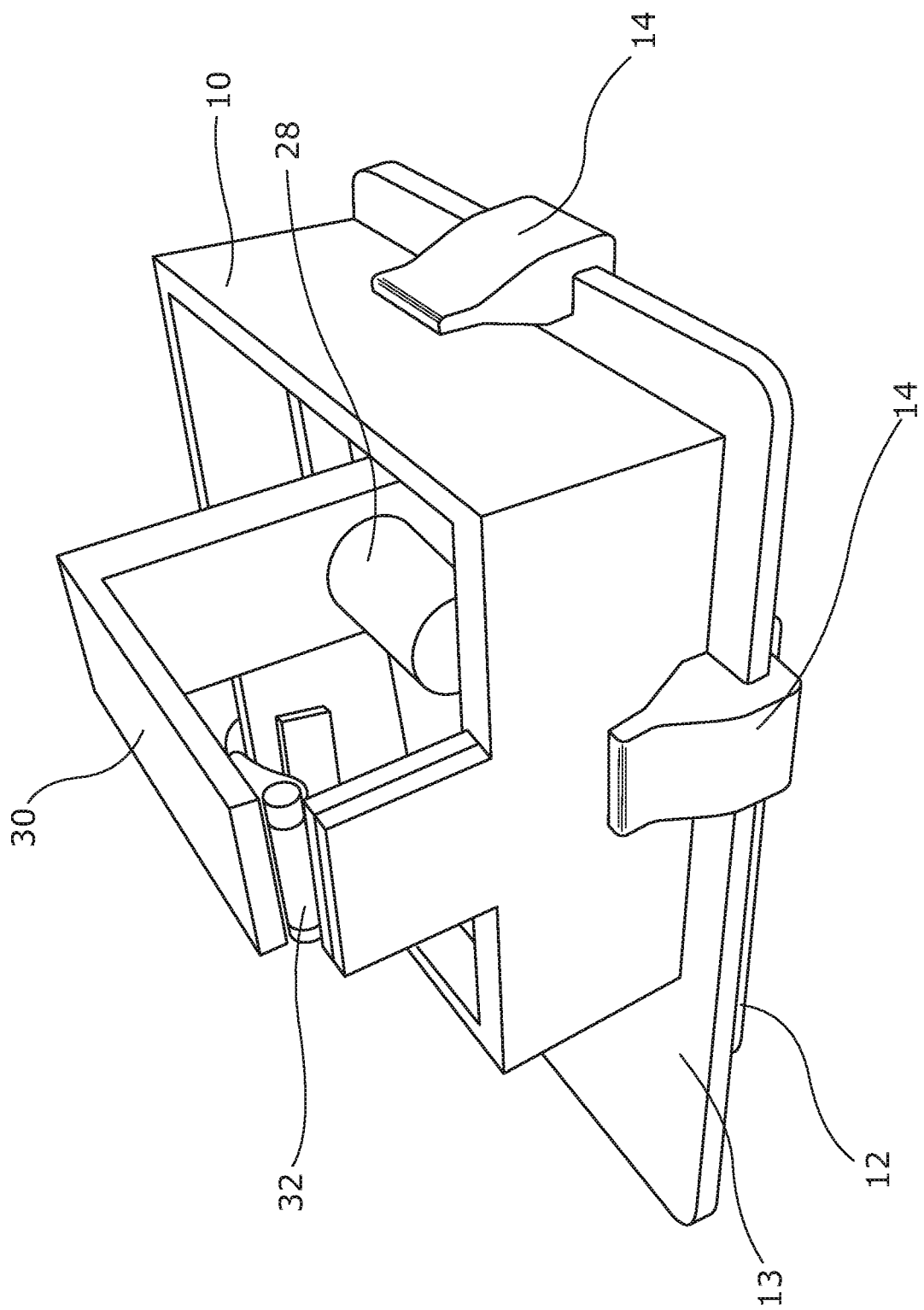
FIG. 4 is a perspective view of the system of FIG. 1 in a folded configuration.

For use in examining a lens 4, 5 in a pair of glasses, a test pattern is displayed in the left hand half 34 of the display screen below the camera. The pair of glasses 2 is mounted in the glasses clamp 16, the position of the jaws 18, 20 being adjusted to ensure a firm but not overtight grip of the glasses 2 in the grooves 18. The position of the clamp 16 is adjusted by moving the jaws along the runner and/or the runner 24 on the rails 26 to position one of the lenses between the test pattern and the camera. The test pattern is now seen by the camera 28 through the lens 4 and a digital image of the test pattern as viewed through the lens can be captured by the camera and image data saved in the computer memory for analysis. This image will be referred to as the "lens image". The test pattern as seen through the lens and captured in the lens image is usually distorted by the lens and by comparing the degree and nature of the distortion of the test pattern from the lens image data with the original image it is possible to derive one or more optical parameters or characteristics of the lens. Several methods which can be used for this analysis in the system 1 will be described below. The results of the analysis are displayed on the right hand side 36 of the display screen 13 as illustrated in FIGS. 2 and 3. Once the examination of one lens 4 is complete the process can be repeated for the other lens 5. The camera mount and camera are omitted from FIGS. 2 and 3 for clarity.

The frame 10 and camera 28 could be mounted centrally of the display screen 13. In this case, the test pattern would be displayed in a central region of the display screen below the camera and the results displayed on display screen to one or both sides of the frame.

In the arrangement set out in FIGS. 1 to 4, the glasses clamp 16 may be calibrated to measure the separation of the centres of the two lenses.

Figure 5:
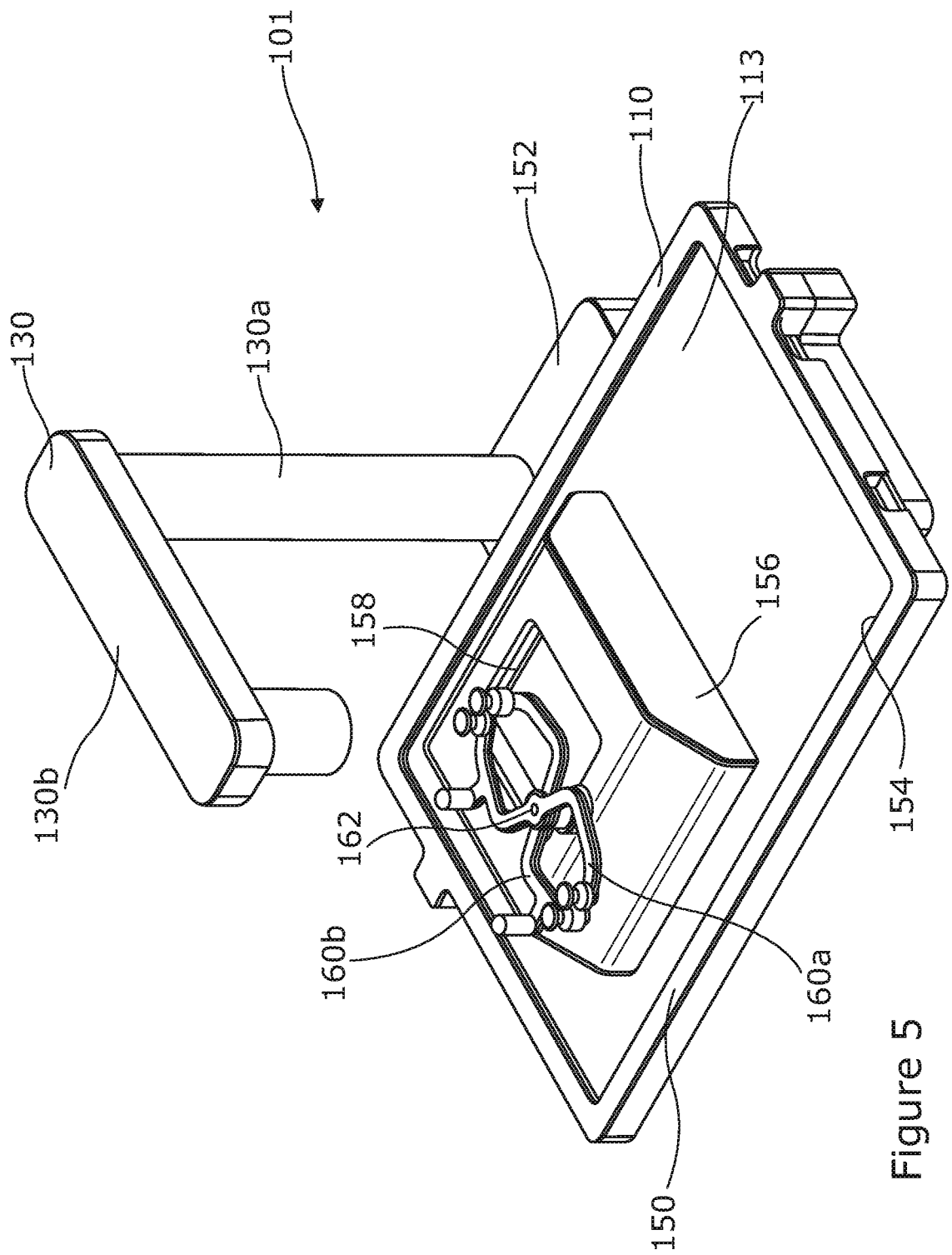
FIG. 5 is a perspective view of a second embodiment of a system for examining lenses in a pair of glasses in accordance with an aspect of the invention.
Figure 6:
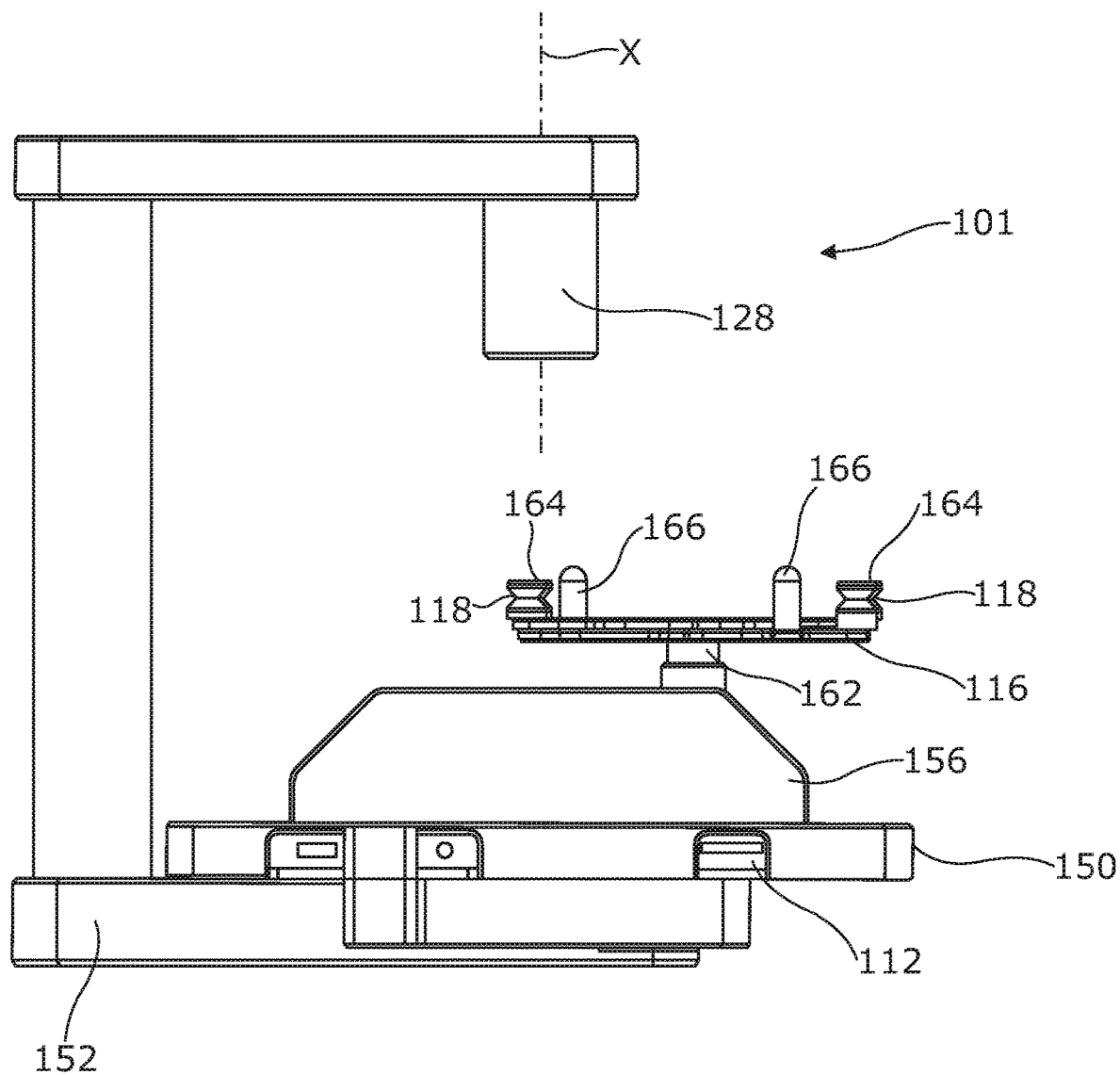
FIG. 6 is a view from one side of the system of FIG. 5.

A second embodiment of a system 101 for examining a lens in a pair of glasses will now be described with reference to FIGS. 5 and 6. In the following description, features of the system 101 that are the same as those described above in relation to the first embodiment 1 or which fulfil the same function will be identified using the same reference numbers but increased by 100.

In the system 101 in accordance with the second embodiment, the frame 110 is in the form of a casing 150 in which the tablet style computer 112 is partially encased and a base 152 to which the casing 150 is mounted. The casing 150 has an aperture 154 in an upper wall so that substantially the whole of the display screen 113 of the computer is exposed. The casing 150 may have a number of parts that are releasably or permanently attached when assembled to the computer. The camera mount 130 is provided on the base 152 and has an upright section 130a extending upwardly to the rear of the computer 112 and a horizontal section 130b extending forwardly from the upper end of the upright section over the display screen 113. The camera 128 is mounted proximal the forward end of the horizontal section 130b so that the axis X of the camera is aligned perpendicular to the display screen 113. The camera mount 130 is off-set to the left side of the computer and is configured so that the axis X of the camera is located generally at the centre of the left-hand half of the display screen, with the camera a suitable distance above screen. The camera 128 is operatively connected to the computer 112 by a suitable cable or other means so that image data captured by the camera can be saved in the computer for image processing and analysis and to allow control of the camera by the computer.

A principal difference of the second embodiment of the system 101 over the first is that the glasses clamp 116 is not mounted to the frame but mounted to a separate plinth 156 which sits directly on the display screen 113. The plinth is placed directly on the screen and can be slid across the screen 113 for correct positioning of a lens relative to the camera and/or the test pattern.

The plinth 156 comprises a main body having a central aperture 158 through which the display screen 113 is visible from above when the plinth is located on the display screen. The glasses clamp 116 is mounted to the plinth body to one side of the aperture 158 and can be pivoted to selectively position either of the lenses in a pair of glasses mounted in the clamp 116 above the aperture.

The glasses clamp 116 in this embodiment has a pair of arms 160a, 160b pivotally coupled together at their centres in a scissor-like manner. The arms 160a, 160b are mounted to a pivot pin 162 so that the arms can pivot relative to each other and so that both arms can be pivoted together about the pin to selectively position one or other lens in a pair of glasses above the aperture 158. Each arm 160a, 160b is generally S shaped and carries an abutment 164 at either end. Each abutment 164 extends upwardly from the arm and is generally cylindrical with a groove 118 about its side for engaging with a pair of glasses. The arms 160a, 160b are configured so that one of the abutments 118 on each arm engages a top edge of the glasses and the other engages the bottom edge. The arms 160a, 160b are biased by a torsion spring to bring the opposed abutments at either end of the clamp together. Lugs 166 are provided on each arm 160a, 160b on one side of the clamp which can be used to move the arms to separate the abutments when mounting a pair of glasses. Once the glasses are in place, the lugs 166 are gently released and the bias force firmly clamps the top and bottom edges of the glasses between the abutments. The abutments 164 may engage with the glasses frame and/or edges of the lenses depending on the style.

The plinth 156 and glasses clamp 116 hold the top and bottom edges of the glasses substantially in a plane parallel to the display screen 113 with the lens being examined spaced from the display screen by a distance, which is usually less than the focal length of the lens. The plinth 156 as illustrated holds a lens to be tested at a fixed spacing from the display screen, which in this embodiment is set to the focal length of +20 D lenses, around 50 mm. It has been found that this distance enables accurate results to be obtained in lenses ranging from −20 D to +15 D. This range covers the majority of lens used by the general public, which tend to fall in the range of −5 D to +5 D. However, it will be appreciated that the plinth could be configured to provide a different spacing between the lens and screen to cope with lenses outside the normal range and the system could be provided with a set of two or more plinths which each provide a different spacing between the lens and the screen. In a further alternative, the plinth 156 could be provided with one or more removable spacer sections which can be selectively used to change the height of the plinth and hence the spacing between the lens and the display screen. For example, to extend the range above +15 D the distance between the lens and the screen would have to be decreased from that discussed above. This could be achieved by removing a spacer section to reduce the height of the plinth above the screen.

The system 101 in accordance with the second embodiment is used to examine the lenses in a pair of glasses in a manner similar to that of the first embodiment. A pair of glasses is mounted in the clamp 116 on the plinth 156 and the clamp pivoted to position one of the lenses which is to be examined over the aperture 158. The plinth 156 is placed on the display screen to locate the lens being examined below the camera. The system 101 is configured to display information on the screen 113 to guide the user in correctly positioning plinth and the lens. This could comprise graphic symbols displayed on the screen 113 which show the user where to position the plinth 156, for example, which may be generated by the computer in response to data from the camera 128. The plinth can be slid over the screen to correctly position the lens and to move the lens position during examination if required. With the lens in position, a test pattern is displayed on the display screen 113 below the camera and the lens and the camera used to capture an image of the test pattern as seen through the lens—the lens image. The (usually distorted) test pattern in the lens image data is analysed the computer which determines the degree and nature of the distortion of the test pattern caused by the lens and from this is able to derive one or more optical parameters of the lens. The results of the analysis are displayed on the right hand side of screen which is not obscured by the plinth.

The camera 128 could be mounted centrally of the display screen 113. In this case, the test pattern would be displayed in a central region of the display screen below the camera and the results displayed to one or both sides of the display screen.

The system 1, 101 in accordance with either of the first and second embodiments is compact, highly portable and self-contained. Using a tablet computer to generate both the test image and display the results analysis and carry out the image processing and analysis eliminates the need to have multiple display units and a separate computing unit. The use of a tablet computer also saves on costs as it eliminates the need to design and manufacture dedicated computing and display hardware.

Figure 7:
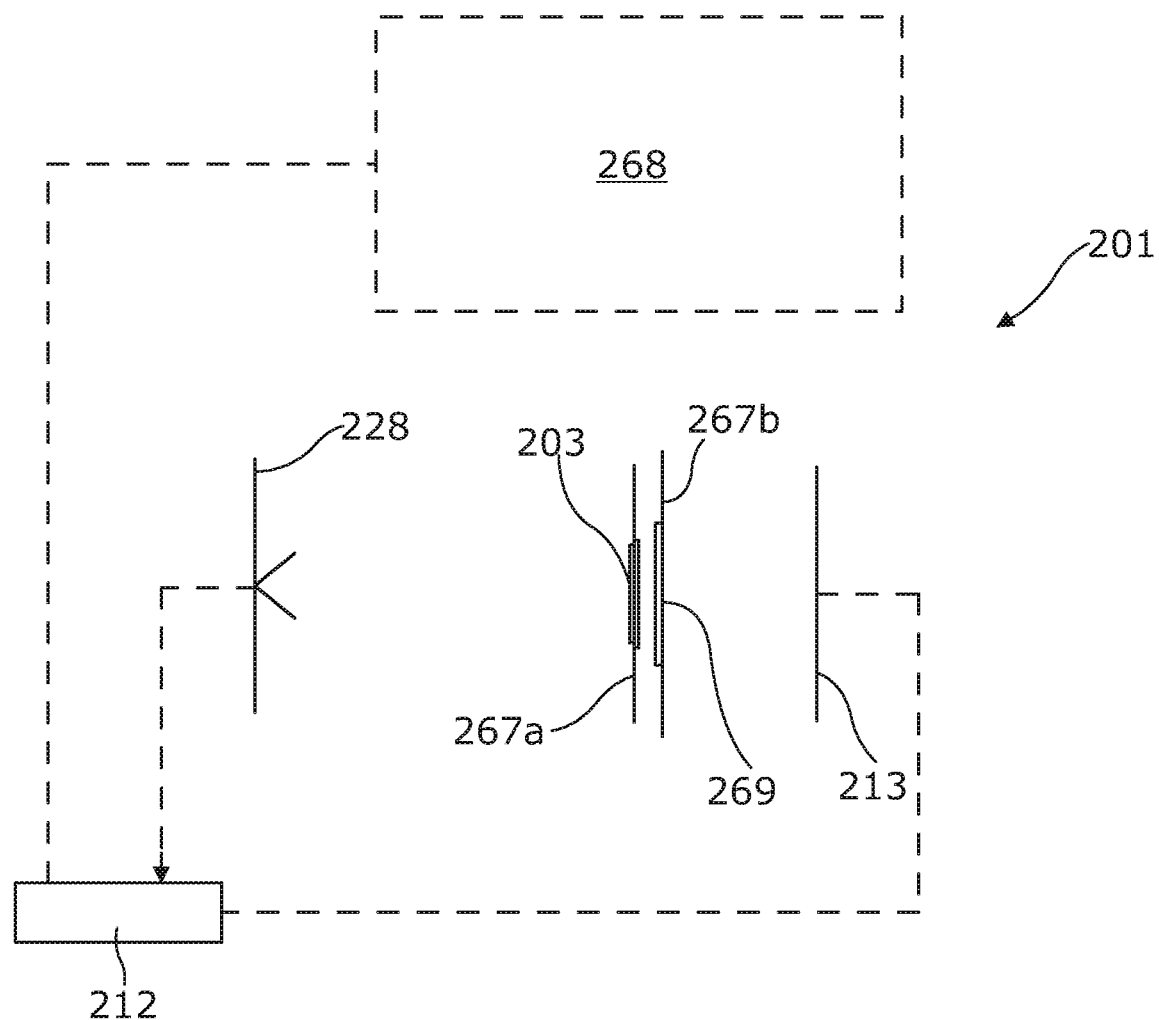
FIG. 7 is a schematic representation of an alternative a system for examining a lens which can be used to carry out the various methods of examining a lens described herein.

The system 1, 101 as described above can be adapted to carry out examination of a lens using a number of different test patterns and methods of analysis, several embodiments of which will now be described in relation to the examination of lens in a pair of glasses using the system 101 according to the second embodiment described above. However, the methods described can also be used in the system 1 according to first embodiment. Indeed, the underlying principles of these methods can be adapted for use in any other suitable lens examining system. FIG. 7 for example illustrates an alternative lens analysis system 201 that can be used to carry out the methods described below. The same reference numerals but increased by 100 will be used to identify features that are the same, or which fulfil the same function, as those of the previous system 101.

The system 201 comprises a camera 228 looking perpendicularly at a display 213 on which a test pattern is displayed as described below. Between camera 228 and display 213 is a lens frame 267a. The camera is connected to a computer 212 which in turn is connected to a screen 268 for the user, and optionally to the display 213, to enable dynamic adjustment of the test pattern. A lens 203 to be examined is inserted in the lens frame 267a so that the lens is orthogonal to the camera 228 and the midpoint of the lens is approximately on the line between the midpoint of the camera lens and the midpoint of the display. The camera is used to capture an image of the distorted test pattern seen through the lens (the lens image) and the distorted test pattern in the lens image is analysed and compared to the original test pattern and the distortions caused by the lens 203 are calculated in computer and used to determine the optical parameters of the lens which are displayed.

Where the distance between the lens 203 and the display 213 is fixed, to allow for examination of lenses having a greater focal length than the spacing, a supplementary compensating lens 269 is inserted in a second frame 267b.

A first embodiment of a method for examining a lens in accordance with an aspect of the invention will now be described with reference to FIGS. 8 to 11.

In the following description and in the claims, the term "ellipse" should be understood as encompassing a circle, which is a special case of an ellipse in which the major and minor axes are equal.

With a pair of glasses mounted in the clamp 116 on the plinth 156 and the clamp pivoted to position one of the lenses which is to be examined over the aperture, the plinth 156 is placed on the display screen 113 to locate the lens being examined below the camera. With the lens in position, a test pattern is displayed on the screen 113 below the camera and the lens and the camera used to capture an image of the distorted test pattern as seen through the lens, the "lens image". The lens image data is saved in the computer for image processing and analysis.

In the method according to this first embodiment, the test pattern 370 comprises at least one set 372 of dots 374 which can be joined by a first ellipse 376 of best fit, in which the major axis $R_1$ and minor axis $R_2$ are equal (in other words, a circle or circular ellipse) as illustrated in FIG. 7. Whilst the dots 374 may be circular, this is not essential and the term "dots" should be understood as encompassing any mark which can be used to indicate a point on the circumference (perimeter) of an ellipse regardless of shape unless otherwise stated.

Any number of dots 374 can be used in the set 372 to define the first ellipse. However, advantageously a minimum number of dots which defines an ellipse with sufficient accuracy is used in each set 372 as this reduces the number of data points that must be analysed and so reduces processing time. In tests, it has been found that an ellipse can be defined with sufficient accuracy using a set of six dots 374 arranged at the apexes of a notional regular hexagon.

Figure 8:
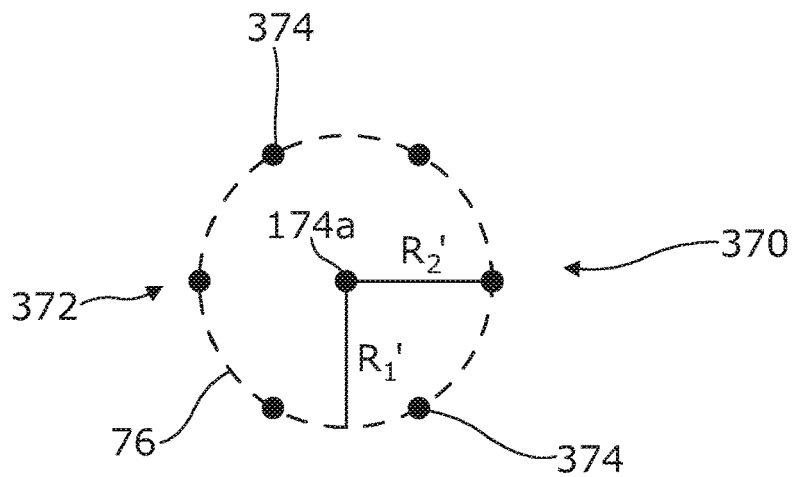
FIG. 8 is a schematic representation of an original test pattern for use in a first embodiment of a method of examining a lens in accordance with an aspect of the invention.

As illustrated in FIG. 8, the test pattern can have an additional dot 374a at the centre of the set. The central dot 374a does not form part of the set but may be helpful in accurate positioning of the set relative to the lens and/or axis of the camera. However, the additional central dot 374a is not essential and could be omitted.

The lens will usually distort the test pattern 370 (unless it is a plain lens), so that in the test pattern in the lens image, the spacing between the dots may increase or decrease depending on the degree of magnification. For a magnification greater than 1, the spacing between the dots increases whilst for magnification less than 1 the spacing between the dots decreases. With a spherical lens, the spacing between the dots changes by the same amount in all directions so that the major and minor axes of an ellipse of best fit joining the dots of the set in the distorted test pattern will be equal. However, a cylindrical lens will vary the spacing between the dots by different amounts in different directions. As a result, the major and minor axes of an ellipse of best fit joining the dots of the set in the distorted test pattern in the lens image will not be equal. Accordingly, by comparing the major and minor axes of an ellipse of best fit defined by the set of dots in the distorted test pattern in the lens image with the major and minor axes of an ellipse defined by the set of dots in the original test pattern, it is possible to determine the magnification of the lens and, where present, astigmatic correction (cylindrical power) and the axis of the astigmatic correction. The power of the lens can be calculated from the magnification using a function $f(M)=P$ in a known manner. This function can be determined from a set of standard lenses of known dioptric power.

Example 1

Figure 9:
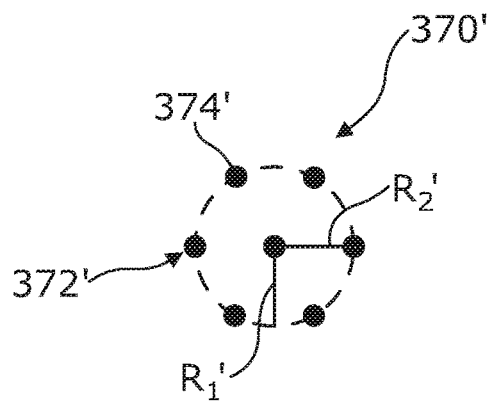
FIG. 9 is a view similar to that of FIG. 8 but illustrating how the test pattern may be distorted through a spherical lens.

FIG. 9 illustrates a distorted test pattern 370' in the lens image captured by the camera for a cylindrical lens. The dots 374' in the set 372' can be joined by a second ellipse of best fit 376', and the computer determines a major axis $R_1'$ and a minor axis $R_2'$ of the second ellipse 376' and compares these with the major axis $R_1$ and minor axis $R_2$ of a first ellipse 76 defined by the set of dots in the original test pattern 370 as illustrated below:

| | | |
|---|---|---|
| $R_1 = 100$ | $R_1' = 50$ | Magnification = 0.5 |
| $R_2 = 100$ | $R_2' = 50$ | Magnification = 0.5 |

In this example, since the lens is spherical, the set 372' of dots 374' in the distorted pattern 370' define an ellipse in which the major and minor axes $R_1'$ and $R_2'$ are equal.

Example 2

Figure 10:
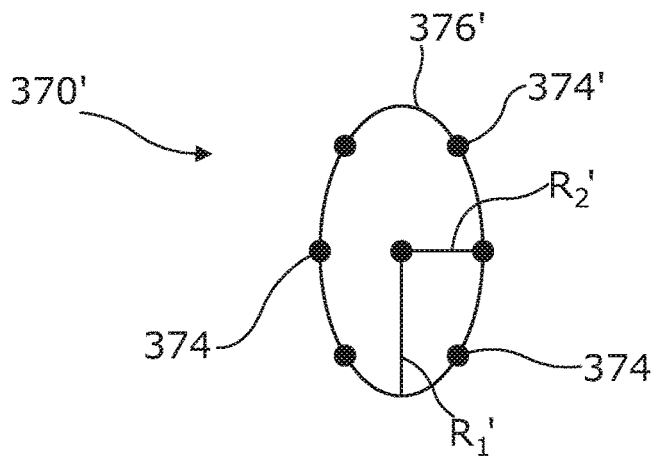
FIG. 10 is a view similar to that of FIG. 8 but illustrating how the test pattern may be distorted through a cylindrical lens.

FIG. 10 illustrates a distorted test pattern 370' in the lens image for a cylindrical lens. The dots 374' in the distorted set 372' can be joined by a second ellipse 376' of best fit and the computer determines a major axis $R_1'$ and a minor axis $R_2'$ of the second ellipse 376' and compares these with the major axis $R_1$ and minor axis $R_2$ of a first ellipse 376 defined by the set of dots in the original test pattern 370 as illustrated below:

| | | |
|---|---|---|
| $R_1 = 100$ | $R_1' = 100$ | Magnification = 1 |
| $R_2 = 100$ | $R_2' = 50$ | Magnification = 0.5 |

In this example where the lens is cylindrical, the dots 374' in the distorted pattern define an ellipse in which the major axis $R_1'$ and the minor axis $R_2'$ are not equal, indicating that the lines has distorted the test pattern by different amounts in different directions. The axis angle of the cylindrical lens can also be calculated by the computer from the direction of the major and minor axes.

The system 101 is configured to use the basic method as described above in a spot mode to determine the optical parameters at a single point in the lens or in a mapping mode to determine the optical parameters at a number of locations over the whole of the lens, or at least within an area of interest of the lens.

Mapping Mode

Figure 11:
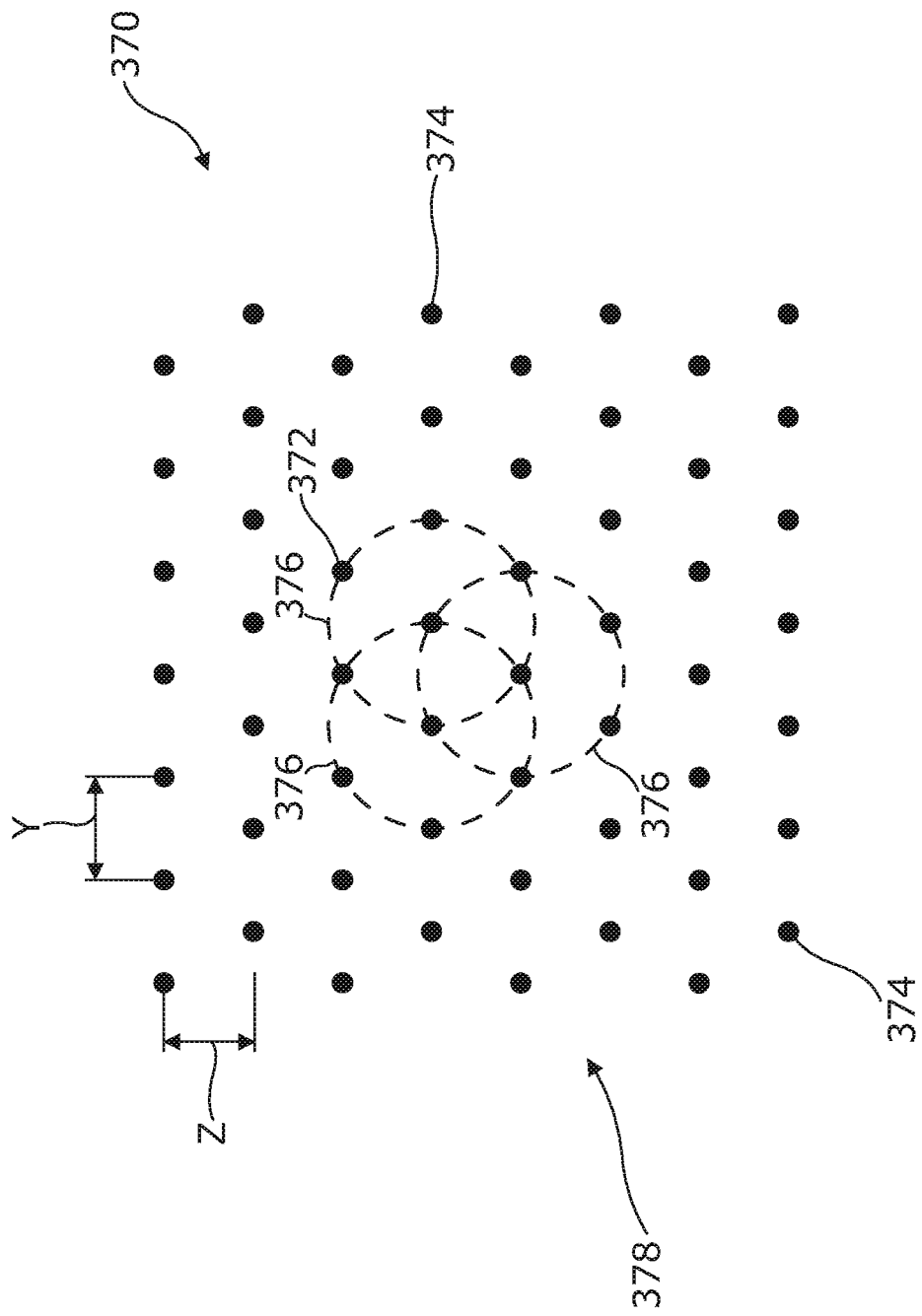
FIG. 11 is a schematic repetition of an alternative original test pattern for use in the first embodiment of a method of examining a lens in accordance with an aspect of the invention.

In the mapping mode, the original test pattern displayed on the screen 113 comprises a number of the sets 372 of dots 374, where the dots in each set 372 can be joined by a first ellipse of best fit having major and minor axes $R_1$, $R_2$ that are equal. The sets are spread over the area of the display screen below the lens and some of the sets 372 may be partially overlapping to ensure that a sufficient number and density of sets are provided such that the optical parameters can be determined at the required number of locations. In a particularly advantageous embodiment, the test pattern 370 comprises a plurality of dots 374 arranged in an array 378 as illustrated in FIG. 11. In the array, the dots 374 are arranged in rows and columns, wherein the dots 374 in each row are equally spaced apart by a distance Y which is equal to the spacing Z between adjacent rows, and wherein alternate rows are off-set so that the dots 374 in any given row lie midway between the dots in an adjacent row or rows. In this test pattern array 378, each dot 374 (other than those at the edges of the array) is surrounded by six other dots 374 which are located at the apexes of a notional regular hexagon. The six surrounding dots form a set 372 that can be joined by a first ellipse 376 of best fit having major axis $R_1$ and a minor axis $R_2$ that are equal. This test pattern 370 can be used to determine the optical parameters of the lens over the whole of the lens, or an area of interest of the lens, by carrying out the above analysis for each hexagonal set 372 of dots 374 within the area of interest. Accordingly, the computer running suitable software determines a major axis $R_1'$ and a minor axis $R_2'$ for a second ellipse 376' of best fit through the dots in each hexagonal set 372 of dots in the distorted test pattern within the area of interest from the lens image data and compares these with the major axis $R_1$ and minor axis $R_2$ respectively of a first ellipse derivable from the corresponding set 372 of dots in the original test pattern. In the original test pattern, every hexagonal set 372 of dots defines a first ellipse 376 of the same size so that the major and minor axes $R_1$, $R_2$ are the same for every hexagonal set 372 of dots in the original test pattern. Accordingly, it is not necessary to actually generate an ellipse and determine the major and minor axes for every hexagonal set 372 of dots in the original test pattern. The computer may only determine the major axis $R_1$ and minor axis $R_2$ for one set or a sample number of the sets. Indeed data for the major axis $R_1$ and minor axis $R_2$ of the first ellipses in the original test pattern may be saved as data in the computer.

The test pattern 370 as illustrated in FIG. 11 provides a convenient way of presenting a large number of sets of dots evenly distributed across the area of interest. Because they are interlinked and partially overlapping, the sets defined in the array are highly concentrated allowing for a detailed analysis of the characteristics of the lens within the area of interest. Each set of dots 372 is used to define the optical parameters of the lens at the position occupied by that set.

The results of the analysis are conveniently displayed on the right hand side of the display screen 113 by means of a graphical representation of the lens in which the optical parameters are displayed in the form of a colour contour map.

Use of the mapping mode provides for a fully automated system of examining a lens which does not require the user to select a number of locations for examination and reposition the lens for each measurement.

Spot Mode

The spot mode of is used to find the optical parameters of the lens at one position only, usually at the optical centre of the lens.

In this mode, only one set of dots 372 defining an ellipse in which the minor and major axes are equal is used as a test pattern as illustrated in FIG. 8. In carrying out the spot mode method, the centre of the test pattern 372 is aligned with the optical centre of the lens and the optical axis X of the camera and the camera used to capture an image of the distorted test pattern 370' through the lens—the lens image. The analysis as described above is then carried out for the single set of dots only to determine the optical characteristics of the lens at that point. This method could though be used to determine the optical parameters of a lens at a single position other than the optical centre.

The displayed test pattern used in the spot mode may be a sub-set of the array 378 used in the mapping mode including one central dot surrounded by six dots at the apexes of the notional hexagon. This is advantageous in enabling the system 101 to use the same grid pattern or part thereof in both modes. However, the central dot is not essential and could be omitted in the spot mode.

The method according to the first embodiment can also be carried out using the first embodiment of the system 1 or indeed any other suitable lens examination system having a means to display the test pattern, a digital camera or other means for capturing an image of the test pattern through the lens, computing means to carry out the required image processing and computational analysis on the image data, and means such as a display screen to display the results. Further, it is not essential that the test pattern be displayed on a digital screen and it could be displayed in other ways such as on printed media. However, the use of a digital display screen, such as the screen 13, 113 of the systems 1, 101 described above, is advantageous as the test pattern can be changed dynamically. This is advantageous, for example, where the lens is held at a fixed distance above the screen as the size and/or spacing of the dots 374 in the test pattern 370 displayed can be varied to accommodate lenses have differing focal length. For example, in the system 101 where the plinth 156 is configured to hold the lens at a distance from the display screen 113 which is set to the focal length of a +20 D lens, the system can handle lenses designed for myopia by adjusting the size and/or spacing of the dots in the test pattern without the need to adopt any particular physical measure or the use of additional lenses.

A second embodiment of a method for examining a lens in accordance with an aspect of the invention will now be described with reference to FIG. 12.

The method according to the second embodiment is similar to the first method described above, except that the test pattern is different.

In the second embodiment, a first test pattern comprising a regular pattern of lines, which may be vertical lines, squares, or sine waves is displayed on the display screen 13, 113. A pair of glasses is mounted to the system 1, 101 as previously described with one of the lenses of the glasses positioned between the test pattern and the camera, with the optical centre of the lens aligned with the optical axis of the camera. An image of the first test pattern as distorted by the lens is recorded (the lens image) and image data sent to the computing unit of the tablet computer 12, 112. The computer determines the degree of distortion of the test pattern caused by the lens by comparing the test pattern in the recorded lens image data with the original test pattern and from this calculates the magnification of the lens. The computer 12, 112 is then able to generate the power and curvature and astigmatic correction of the lens and displays this (item 38) on the right hand half 36 of visual display unit 13 (see FIG. 2). No distortion would, of course indicate a plain glass lens. The power can be determined using a function f(M)=P which may be determined from a set of standard lenses of known power as described above.

The first test pattern is replaced by a second test pattern of concentric circles on the display screen 13, 113. The centre of the lens, the axis X of the camera and the centre of the circles are aligned and an image of the distorted second test pattern as seen through the lens (the lens image) is captured by the camera and again sent to the computer 12, 112. On the basis of the previous power calculations, the computer will identify specific points on the lens from which an image should be obtained. This can be done by moving the lens relatively with respect to the axis X of the camera, moving the glasses clamp 16 on the rails 26 in the first system 1 or by moving the plinth 156 in the second system 101. By comparing the lens images obtained with known images the computer is able to derive and display a results image representative of the optical parameters of the in the right hand part of the screen. The results image shown will be characteristic of the lens. In this system a uniform image would be characteristic of a plain lens, an image changing darkening colour from bottom to top, would be a progressive lens pattern, an image bright at the bottom but changing suddenly to dark would be a bifocal, colour brightness changing from right to left would be characteristic of a prismatic. In FIG. 3 the image generated by a plain lens is shown at 40.

Figure 12:
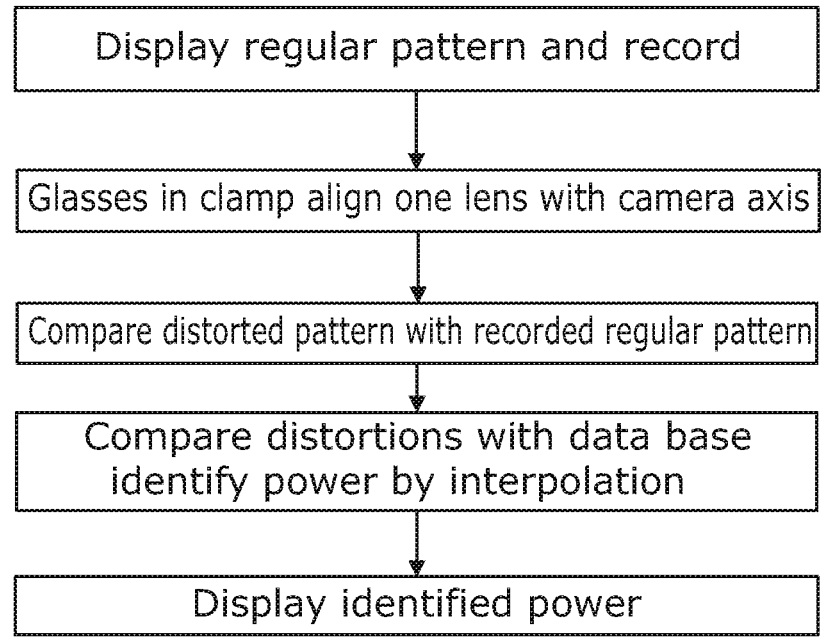
FIG. 12 is a flow diagram showing the steps in measuring the power of a lens in a second embodiment of a method of examining a lens in accordance with an aspect of the invention.
Figure 12:
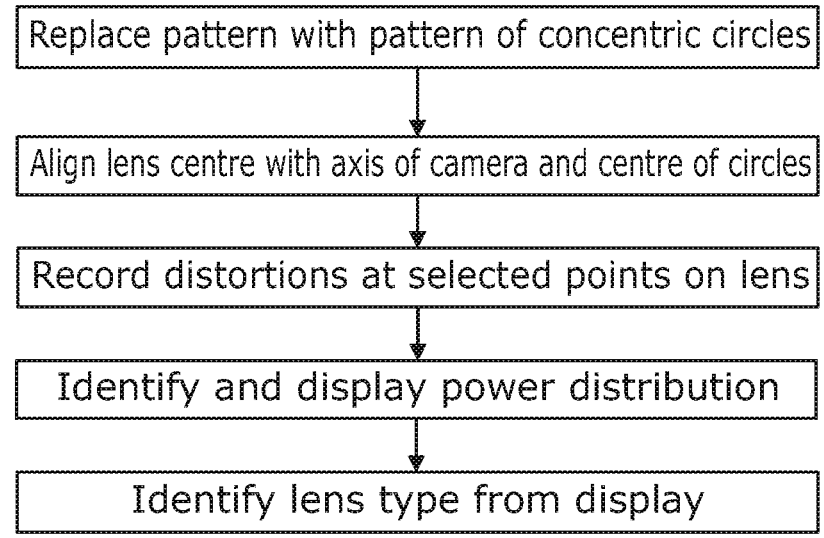

The method used is to set out block diagram form in FIG. 12.

Regardless of which of the methods of analysis described above are used, it may be necessary to calibrate the system used to carry out the method in order to remove distortions to the test pattern in the lens image captured by the camera produced by the system itself rather than by the lens. Such system distortions may arise, for example, in displaying the test pattern on the screen 13, 113 and in capturing an image of the test pattern using the camera 128.

Accordingly, the methods described above may include a calibration step in which an image of the original test pattern displayed on the screen 13, 113, 213 is captured by the camera 28, 128, 228 without a lens in place. This can be called a "system image". The test pattern in the system image is compared to the original test pattern by the computer to determine what distortions have been introduced by the system. The computer 12, 112, 212 using appropriate algorithms, calculates error coefficients and generates a transform algorithm which can be applied to the distorted test pattern in the system image data to transform it back to the original, perfect test pattern. The transform algorithm is stored in the computer.

When a lens is subsequently tested, the test pattern in the lens image captured by the camera includes distortions introduced by the system and distortions introduced by the lens. The transform algorithm is applied to the test pattern in the lens image data to remove the system distortions. The resulting test pattern can be called a "transformed test pattern". Any remaining distortions in the transformed test pattern are the result of the lens only and the transformed test pattern can be compared with the original test pattern to determine the optical parameters of the lens in accordance with the methods described above.

Calibration may not be required where the system is of sufficient quality such that any system distortions are negligible and is less important for the spot mode in the first method. Where calibration is required, it may only be necessary to derive a suitable transform algorithm once when the system is first commissioned and then to use the stored transform algorithm each time a lens is examined. However, for other systems it may be necessary to check the calibration and derive a transform algorithm periodically to ensure that further system errors have not been introduced over time. For portable systems such as the systems 1, 101 described above, it may be necessary to check the calibration and derive a transform algorithm each time the system is set up and/or transported. In some cases it may be necessary to check the calibration and derive a transform algorithm each time a lens is tested or at least each time a new pair of glasses is to be tested.

The above embodiments are described by way of example only. Many variations are possible without departing from the scope of the invention as defined in the appended claims and statements of invention.

The invention claimed is:
1. A method of examining a lens, the method comprising;
  a. displaying on a plane surface a test pattern comprising at least one set of dots arranged to define a first ellipse, the first ellipse being an ellipse of best fit joining all the dots in the at least one set, and the major and minor axes of the first ellipse are equal;

b. positioning a lens to be examined between the displayed test pattern and a camera and using the camera to capture an image of the test pattern through the lens ("the lens image");

c. deriving a second ellipse which is an ellipse of best fit joining the dots in said at least one set of dots in the test pattern from the lens image captured in step b; and d. comparing characteristics of the second ellipse with corresponding characteristics of the first ellipse to determine the degree and nature of distortion to the test pattern and from this determining at least one parameter of the lens, including the power of the lens.

2. A method as claimed in claim 1, wherein the number of dots in said at least one set is no more than twenty.

3. A method as claimed in claim 1, wherein said at least one set of dots comprises six dots arranged at the apexes of a notional regular hexagon.

4. A method of examining a lens as claimed in claim 1, the method comprising determining the major axis and the minor axis of the second ellipse and comparing these with the major axis and the minor axis respectively of the first ellipse to determine the degree and nature of distortion to the test pattern.

5. A method as claimed in claim 4, wherein when the major and minor axes of the second ellipse are not equal, the method comprises determining a degree of astigmatism correction (cylindrical power) of the lens and the axis angle of the astigmatism correction.

6. A method as claimed in claim 1, wherein the method is used to determine the at least one optical parameter at a single point in the lens, the method comprising aligning the optical centre of the lens with the axis of the camera and with the centre of one of said at least one sets of dots before capturing the lens image and then performing the analysis in steps c and d of claim 1 in respect of said one of said at least one sets of dots.

7. A method as claimed in claim 1, wherein the method is used to determine said at least one optical parameter of the lens at multiple locations within an area of interest of the lens, the method comprising:

a. in step a of claim 1, displaying a test pattern comprising a plurality of said sets of dots distributed over an area of the surface;

b. in step b of claim 1, positioning the lens so that at least the area of interest of the lens is between the test pattern and the camera before capturing the lens image; and c. performing the analysis in steps c and d of claim 1 in respect of each of said sets of dots in the test pattern recorded in the lens image within the area of interest to determine said at least one optical parameter at various locations with the area of interest of the lens.

8. A method as claimed in claim 7, wherein step c of claim 7 comprises deriving a respective second ellipse for each of said sets of dots in the test pattern recorded in the lens image within the area of interest, determining a major radius and a minor radius for each respective second ellipse and comparing these with the major and minor axes respectively of a first ellipse derivable from the corresponding set of dots in the test pattern.

9. A method as claimed in claim 7, wherein the test pattern comprises a plurality of dots arranged in an array of rows and columns, wherein the dots in each row are equally spaced apart, and wherein alternate rows are off-set so that the dots in any given row lie midway between the dots in adjacent rows, such that each dot (other than those at the edges of the array) is surrounded by six other dots located at the apexes of a notional regular hexagon centred on the dot, wherein each set of six other dots comprises one of said sets of dots.

10. A method as claimed in claim 9, wherein the analysis in steps c and d of claim 1 is carried in respect of each set of six other (surrounding) dots within the area of interest.

11. A method as claimed in claim 1, wherein the method comprises calibrating the system used to display the test pattern and capture the digital image by:

a. using the camera to capture a digital image of the test pattern displayed on the surface without a lens between the camera and the surface ("the system image");

b. comparing the test pattern in the system image with an original test pattern to determine the degree of distortion to the original test pattern produced by the system;

c. deriving a transform algorithm which applied to the test pattern in the system image will substantially restore it back to the original test pattern and saving the transform algorithm; and d. subsequently when examining a lens, applying the transform algorithm to the test pattern in the lens image before carrying out the analysis in steps c and d of claim 1.

12. A system for examining a lens comprising;

a computing device having a planar display screen, a camera mounted above the screen with the axis of the camera perpendicular to the plane of the screen, the camera being operatively connected to the computing device for storing and processing data relating to images captured by the camera; and a glasses mount for holding a pair of glasses with a lens located between the camera and the display screen in use, wherein the computing device is configured for:

a. displaying on a plane surface a test pattern comprising at least one set of dots arranged to define a first ellipse, the first ellipse being an ellipse of best fit joining all the dots in the at least one set and the major and minor axes of the first ellipse are equal;

b. positioning the lens to be examined between the displayed test pattern and the camera and using the camera to capture an image of the test pattern through the lens ("the lens image");

c. deriving a second ellipse which is an ellipse of best fit joining the dots in said at least one set of dots in the test pattern from the lens image captured in step b; and d. comparing characteristics of the second ellipse with corresponding characteristics of the first ellipse to determine the degree and nature of distortion to the test pattern and from this determining at least one parameter of the lens, including the power of the lens.

13. A system as claimed in claim 12, wherein the computing device is configured in use to display the test pattern in a first section of the display screen below the camera and to display the results of the examination in another section of the display screen.

* * * * *